3,399,328
ELECTROCHEMILUMINESCENCE OF 2,3,6,7-TETRAPHENYLISOBENZOFURAN AND RELATED MATERIALS

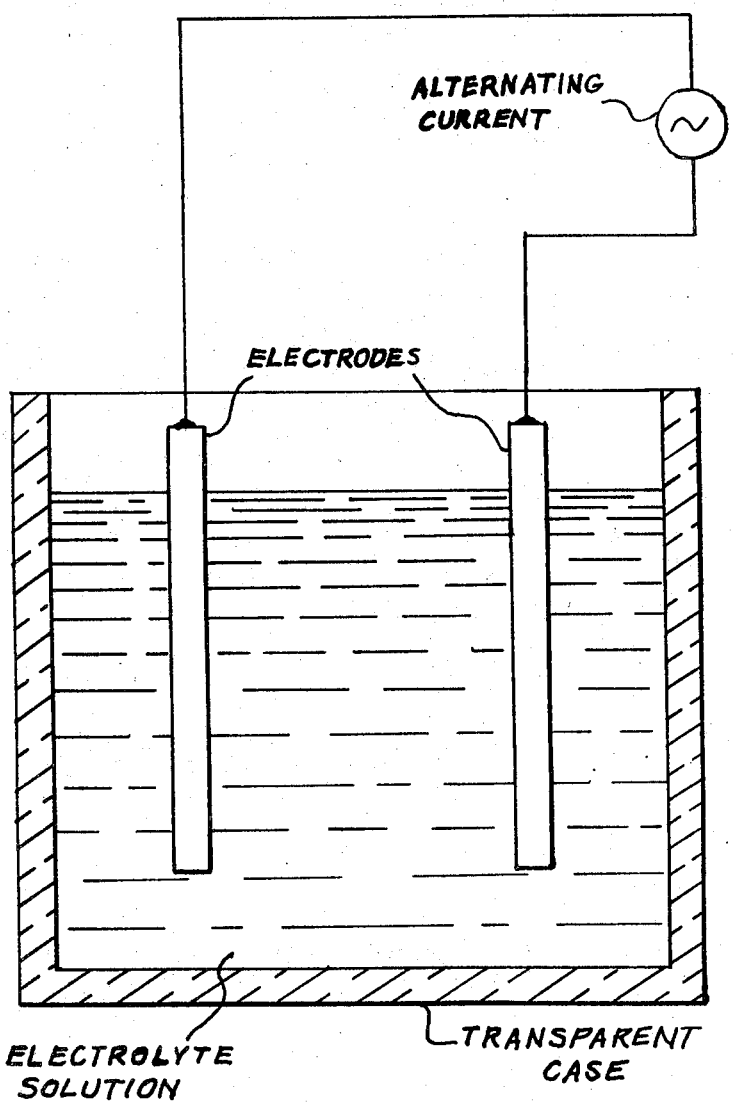

Arnold Zweig, Westport, Conn., assignor to American Cyanamid Company, Stamford, Conn., a corporation of Maine
Filed Nov. 22, 1965, Ser. No. 509,148
9 Claims. (Cl. 315—246)

ABSTRACT OF THE DISCLOSURE

A method and means for obtaining light by passing an alternating current between electrodes in an electrolyte having a tetra-aromatic substituted isobenzofuran fluorescent compound in an inert solvent.

---

The present invention relates to solution phase electroluminescence. The invention includes the discovery of a new class of superior electroluminescent compositions.

It has been found, pursuant to the instant discovery, that an unexpectedly high degree visible electroluminescent emission may be generated by applying alternating current, at a sufficient voltage, to the electrodes, e.g., platinum, mercury, or the like, of an electrolytic cell in an inert solvent containing a particular class fluorescent organic compound of this invention and a suitable supporting electrolyte. This invention represents an improvement in the invention disclosed in copending application Ser. No. 504,111.

I have discovered that a high order of luminescence can be obtained from a new class of electrochemiluminescent fluorescers of the formula:

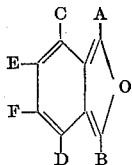

in which A, B, C, and D are members selected from the group consisting of aryl such as phenyl, 1-naphthyl, 1-anthracenyl, 2-anthracenyl, 9-anthracenyl, phenanthryl, pyrenyl, tetracenyl, singly or multi-ply substituted alkoxyaryl such as methoxyphenyl, dialkylamino-aryl such as dimethylamino-phenyl, and the like, and in which E and F are each selected from hydrogen and aryl substituents typically of the type above. To obtain the preferred results, each of E and F are hydrogen. The preferred electrochemiluminescent fluorescers of this invention which obtain the highest, and therefore ordinarily the most desirable, order of illumination are: 3,6-diphenyl-2,7-di-p-methoxy-phenyl-isobenzofuran:

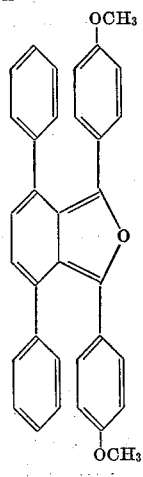

2,7-diphenyl-3,6-di-p-methoxyphenyl isobenzofuran:

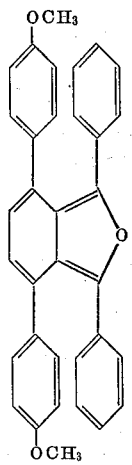

2,3,6,7-tetra(p-methoxyphenyl)isobenzofuran:

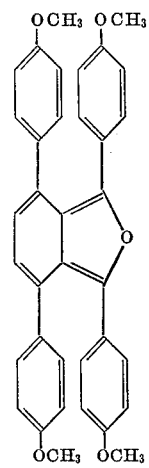

2,3,6,7-tetraphenylisobenzofuran:

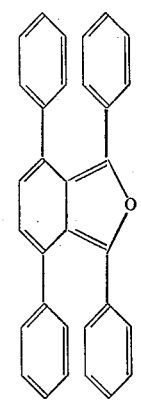

In order to obtain the electrochemiluminescence, it is critical that the electrochemiluminescent fluorescent compound of this invention be present in a concentration of at least about one millimolar up to about 20 millimoles. For the preferred results, it is critical that at least about 5 to about 10 millimoles be employed. The electrolyte may range from about 0.01 M to about 1.0 M., the preferred results requiring at least about 0.1 M.

Typically, dimethylformamide (DMF) solvent containing $2 \times 10^{-3}$ mole of the fluorescent compound of this invention, and 0.1 mole of tetrabutylammonium perchlorate as the supporting electrolyte is a system which will emit light, without any appreciable consumption of the solution components of the system as compared to prior systems, when placed in an electrolytic cell containing electrodes and 60-cycle alternating current applied to the electrodes. Visible light is emitted at or near each electrode surface as long as alternating current of sufficient voltage is applied.

Pursuant to the instant discovery, therefore, a method of generating a useful, visible, electroluminescent emission in an electrolytic cell has been found which comprising subjecting an electrolytic cell containing at least two electrodes in a medium comprising an inert solvent, a fluorescent organic compound of this invention, and a supporting electrolyte to an alternating current at a sufficient voltage (potential) at at least one electrode to convert said fluorescent organic compound to its corresponding oxidized or reduced state, by giving up or taking on at least one electron, and said alternating current providing sufficient potential change on reversal of the alternating cycle to provide an amount of energy about sufficient to ultimately transform (regenerate) said fluorescent organic compound to its original oxidation state but in its singlet excited state. The compound rapidly returns to its ground (non-excited) state by the emission of light.

As indicated above, the fluorescent organic compound is either alternately oxidized to an oxidized state (i.e., a cation radical) in what is the anodic excursion of the applied potential and reduced to the excited state of the fluorescent organic compound in what is the cathodic excursion of the applied potential; or the fluorescent organic compound is reduced to a reduced state (i.e., an anion radical) in what is the cathodic excursion of the applied potential and oxidized to the excited state of the fluorescent organic compound in what is the anodic excursion of the applied potential. Fluorescent compounds which emit red light upon excitation require at least anodic or cathodic voltage excursion and, consequently, the least voltage change at an electrode to provide visible light. On the other hand, fluorescent compounds which emit blue light upon excitation require greater anodic or cathodic excursions and higher voltage change at the electrode.

The upper and lower limits of the instantaneous potential applied to the electrode required to produce light will depend on the fluorescent organic compound used. Thus either the upper limit of the applied potential must be sufficiently positive to convert the fluorescent organic compound to an oxidized state or the lower limit of the potential applied to the electrode must be sufficiently negative to convert the fluorescent organic compound to a reduced state. Moreover, the potential difference between the upper and lower values of the instantaneous applied potential must be at least about sufficient to provide enough energy to produce said fluorescent organic compound in its singlet excited state.

Broadly, the voltage requirement may be defined as ranging from about 5 volts to 10 volts. The optimum and therefore preferred results are obtained when a voltage of at least about 6 v. up to not more than about 7 v. is employed.

In general terms, the process described above requires only electron transfer to a cation radical or electron transfer from an anion radical in an electrolyte cell where electron transfer occurs over a sufficient potential to provide an excited state, and where the resulting excited state or a subsequently formed excited state is capable of fluorescent emission of light. The general process is described in Equation 1 and 2 below where $A^+$ and $A^-$ refer to a cation radical and an anion radical respectively, E refers to an electron, and $A^*$ refers to an excited state produced by electron transfer.

(1)

$$A^+ + E \rightarrow A^*$$

(2)

$$A^- - E \rightarrow A^*$$

The singlet excited state of the fluorescent organic molecule may be obtained directly typically as in Equation 3 or by an indirect route, typically as shown in Equation 4 below.

(3)

(a) $A^+ + A^- \rightarrow A^* + A^\circ$
(b) $A^* \rightarrow A^\circ + \text{light}$ (4)

(a) $A^+ + A^- \rightarrow A\dagger + A^\circ$
(b) $2A\dagger \rightarrow A^* + A^\circ$
(c) $A^* \rightarrow A^\circ + \text{light}$ The potential difference required by the indirect route normally is lower than that required by the direct route.

Generally, the potential difference between the upper and lower limits of the instantaneous applied voltage must exceed about 1.5 volts.

Potentials (relative to a standard electrode, such as the saturated calomel electrode), required to oxidize or reduce organic compounds of the type contemplated herein can be easily measured by standard polarographic techniques. Cf. I. M. Kolthoff and J. J. Lingane, Polarograph, 2nd Edition, 1952, Interscience Publishing, New York, N.Y. Likewise, minimum energy required for converting organic compounds of the type contemplated herein to their singlet excited states are easily measured by such techniques as absorption or emission spectroscopy. Cf. S. F. Mason, Molecular Electronic Absorption Spectra, Quarterly Reviews, 15, 287 (1961).

The process of the present invention has multiple uses in the fields of illumination, information display, etc. For instance, an electrolytic cell is in essence a light bulb, the electrolytic cell comprising a stoppered transparent bottle having two electrodes therein, the ends of which are immersed in the fluorescent-solvent-electrolyte system. If desired, the bulb-shaped cell could be replaced by a tubular, or cube-shaped cell, or by any other design desired. Likewise, multiple pairs of electrodes may be used in any given cell, each pair operating independently, if desired. Still other uses will be discussed in greater detail hereinafter. A suitable cell is shown in the figure.

Obviously, as indicated hereinabove, the solution system as well as the nature of the electrode determine the upper limit of the potential difference.

Insofar as the frequency of the applied alternating voltage is concerned, it can range from a few cycles per minute up through the audio range and beyond.

Broadly the frequency may range from about 50 to about 200 cycles per second. To obtain the optimal (and therefore the preferred) results, the frequency should be at least about 60 cycles per second.

Temperature does not appear to be critical, the temperature normally ranging from zero up to about 60° C.

A wide variety of supporting electrolytes may be employed herein to effect the invention. It is essential that these electrolytes do not hinder to any substantial degree the necessary anodic or cathodic excursion, for instance, and thus prevent conversion of the organic fluorescent compound to its excited state. It will be recognized by the person skilled in the art that a non-interfering electrolyte for one organic fluorescent compound may interfere with another organic fluorescent compound, and vice versa. Obviously, therefore, it is within the purview of the instant discovery and within the skill of a chemist to employ an electrolyte which is compatible with the organic fluorescent compound employed. The electrolyte should likewise be electro-inactive over the potential range required for the luminescent reaction, it should provide satisfactory conductivity, and it should not quench the luminescence.

Typical suitable electrolytic cations are tetra-alkyl (lower)ammonium ions, alkali metal ions, alkaline earth ions, and the like. Typical anions are perchlorate ions, hexafluoroarsenate ions, hexafluorophosphate ions, chloride ions, bromide ions, and the like. Thus, typical compounds include tetraethylammonium bromide, tetraethylammonium perchlorate, tetra-n-butyl ammonium perchlorate, lithium bromide, sodium perchlorate, tetramethylammonium hexafluoroarsenate, tetrabutylammonium tetraphenyl borate, calcium perchlorate, tetrapropyl ammonium hexafluorophosphate, lithium aluminum chloride, tetrabutyl ammonium bromide, etc.

Insofar as solvents are concerned, a wide variety of these may be employed. In fact, any substantially inert organic or inorganic solvent for the organic fluorescent compound and electrolyte, which solvent is sufficiently non-protonating and irreducible to preserve the desired degree of reversibility (i.e., it should provide a lifetime of the radical ion at least equivalent to the reciprocal of the frequency employed) is satisfactory provided it is rendered conducting by the addition of an electrolyte of the type contemplated herein.

Typical solvents are the following aprotic solvents: nitriles, such as acetonitrile; sulfoxides, such as dimethylsulfoxide, ethers, such as tetrahydrofuran, dioxane, diethyl ether, 1,2-dimethoxyethane, and the like; amides, such as dimethylformamide (i.e., DMF): carbonates, such as propylene carbonate; nitroalkanes, such as nitromethane; dialkyl sulfites, such as dimethylsulfite; and other like solvents. The preferred solvent, however, is DMF.

It is not necessary that these solvents be anhydrous, since up to about 10% water has been present in some cases without interfering with the emission of visible light. The person skilled in the art will recognize that numerous other substantially inert organic and inorganic solvents, even though not essentially or substantially aprotic, are compatible with the process and solution system and are substantially not fluorescence quenchers. Solvent mixtures may likewise be employed.

In conjunction with the excited state referred to hereinbefore, it should be noted that the "energy of an excited state" is an easily measured experimental value. For example, the energy difference between a first excited singlet and its corresponding ground state is defined by the frequency of the first absorption band in the ultraviolet or visible spectrum of the ground state species.

The physical energy released by a reaction is also an experimental quantity. For instance, the energy of a reaction of the type given in the specific embodiment described above, can be determined by polarographic measurements and other procedures well known to the physical chemist.

Thus the operable limits of electroluminescence are capable of independent measurement and of clear definition in terms of physical characteristics. Consequently, generating electroluminescent emission by the process contemplated herein can be accomplished by first recognizing the known physical characteristics of the fluorescent organic compound, as well as the physical characteristics of the inert solvent and the electrolyte to be used. It has been found, however, that the potential change during the electrode excursion can be several tenths of a volt less than that required to provide the energy of a singlet excited state and still be sufficient to generate noticeable light emission. Best results are generally obtained, however, when the calculated singlet excitation energy or more is provided. It should also be noted that the voltages referred to are exclusive of additional voltage that might be required to overcome the electrical resistance of the solvent-electrolyte employed.

The temperature at which the process of the present invention is carried out is not critical; very excellent results have been achieved at ambient temperatures. For best results the solvent employed is deaerated, such as by bubbling nitrogen, or the like, therethrough, thus providing improved conditions and helping to insure a substantially inert solvent.

Actual examples disclosing preparation of materials:

EXAMPLE I

Preparation of 2,3,6,7-tetraphenylisobenzofuran (This procedure is identical to that in the literature—E. D. Bergmann, S. Blumberg, P. Bracha, and S. Epstein, Tetrahedron, 20, 195 (1964)).

20.8 g. of trans-1,4-diphenylbutadiene (commercially available) and 23.6 g. trans-1,2-dibenzoylethylene were refluxed in 350 ml. of isopropyl alcohol for 8 hours. The adduct, 1,2-dibenzoyl-3,6-diphenyl-4-cyclohexene crystallized on cooling and was recrystallized from n-butyl acetate, M.P. 179–180°, yield 23 g. (52%). A solution of 4.3 ml. of bromine in 90 ml. of chloroform was added to 18.5 g. of 1,2-dibenzoyl-3,6-diphenyl-4-cyclohexene in 130 ml. of refluxing chloroform. The mixture was refluxed for 20 minutes, evaporated to dryness and the residue triturated with alcohol and recrystallized from butyl alcohol and xylene to yield 16 g. (86% of 1,2-dibenzoyl-3,6-diphenylbenzene, M.P. 212°).

To a solution of 3 g. of 1,2-dibenzoyl-3,6-diphenylbenzene and 3 g. of sodium hydroxide in 75 ml. of ethanol, 3 g. of activated zinc was added. The mixture was refluxed until the liquid was yellow and was then filtered into 75 ml. of acetic acid. Upon addition of 10 ml. of water, 2.1 g. (72%) of the intensely green fluorescent 2,3,6,7-tetraphenylisobenzofuran M.P. 258–259° was obtained. Repeated recrystallization from benzene followed by sublimation increased the M.P. of the isobenzofuran to 263–264°.

EVALUATION OF 2,3,6,7-TETRAPHENYLISOBENZOFURAN

Two 1 cm.$^2$ platinum gauze electrodes were placed 2 mm. apart in a glass cell containing a solution of 2,3,6,7-tetraphenylisobenzofuran (1 mM.) and tetra n-butyl-ammonium perchlorfate (.1 M.) in pure, dry dimethyl formamide. The solution was purged of oxygen with dry nitrogen and 8 v., 60 c.p.s. current was imposed on the electrode with a square wave generator. The electrodes lit with an intensity of 1.9 foot lamberts.

When the isobenzofuran concentration in Example I was increased to 2 mM., the brightness increased to 7.4 foot lamberts. All other variables were unchanged.

Further increase in the isobenzofuran concentration in Example I lead to continued increase in brightness until saturation (6 mM.) where 20.0 foot lamberts were achieved.

EXAMPLE II

Preparation of 2,3,6,7-tetra(p-methoxyphenyl)isobenzofuran 5.92 g. of trans-1,2-di-p-methoxybenzoylethylene and 5.32 g. of trans-1,4-di-p-methoxyphenyl - 1,3 - butadiene were melted together and kept at 160°–170° for 3.5 hours. The brown product was cooled and recrystallized from etthanol to give 10.8 g. (96%) of 1,2-di-p-methoxybenzoyl - 3,6 - di-p-methoxyphenyl-4-cyclohexene, M.P. 143°–145°.

Treatment of 5.62 g. of 1,2-di-p-methoxybenzoyl-3,6-di-p-methoxyphenyl-4-cyclohexene in 300 ml. or refluxing chloroform with 3.2 g. of bromine in 50 ml. of chloroform gave after work up as in Example I, 3.4 g. of 1,2-di-p-methoxybenzoyl-3,6-di - p - methoxyphenylbenzene, M.P. 188–189°.

Refluxing 3 g. of 1,2-di-p-methoxybenzoyl-3,6-di-p-methoxyphenylbenzene and 6 g. of potassium hydroxide in 300 ml. of ethanol for one-half hour was followed by addition of 6 g. of activated zinc. Work-up (as described in Example I) gave 900 mg. of green-yellow crystals, M.P., 233–235°, of 2,3,6,7-tetra(p-methoxyphenyl)isobenzofuran.

EVALUATION OF 2,3,6,7-TETRA (p-METHOXYPHENYL) ISOBENZOFURAN

A 5 mM. solution of 2,3,6,7-tetra(p-methoxyphenyl)

isobenzofuran had a brightness of 0.2 ft. lamberts at 8 v. under the conditions described in Example I. At 7 v. the brightness increased to 19 foot lamberts, at 6 v. it decreased to 12 foot lamberts and at 5 v. it was at 0.0 foot lamberts.

EXAMPLE III

Part A 2,7-DI-p-METHOXYPHENYL-3,6-DIPHENYLISO-BENZOFURAN

This compound was prepared in the same manner as the isobenzofuran in Example II except that 1,4-diphenyl butadiene was condensed with 1,2-di-p-methoxybenzoyl ethylene. The yellow fluorescent product obtained after the subsequent reactions with bromine and zinc, melted at 226°.

Part B 2,7-DI-PHENYL-3,6-DI-p-METHOXYPHENYLISO-BENZOFURAN

This compound was prepared in the same manner as the isobenzofuran in Example II except that 1,4-di-p-methoxyphenylbutadiene was condensed with 1,2-dibenzoylethylene. The green fluorescent product obtained after the subsequent reactions with bromine and zinc melted at 195–196°.

Evaluation of 2,7-di-p-methoxyphenyl-3,6-diphenylisobenzofuran

When the frequency of the imposed current in Example III (6 mM. solution) was increased from 60 c.p.s., the brightness of the electrodes increased until 120–130 c.p.s. where a brightness of 22.0 foot lamberts was recorded.

A 5 mM. solution of 2,7-di-p-methoxyphenyl-3,6-diphenylisobenzofuran under the conditions described in Example I lit with a brightness of 28 foot lamberts with 7 v. imposed on the electrodes.

Increasing the concentration of the above isobenzofuran, increased the brightness until 10mM. a brightness of 37 foot lamberts was recorded. Further increase in concentration to 15 mM. decreased the brightness. The lifetime at 10 mM. concentration was 280 minutes.

Evaluation of 2,7-diphenyl-3,6-di-p-methoxyphenyl isobenzofuran

A 5 mM. solution of 2,7-diphenyl-3,6-di-p-methoxyphenylisobenzofuran had a brightness of 3.2 foot lamberts at 8 v., 1.3 foot lamberts at 7 v. and 0.07 foot lamberts at 6 v. under the conditions of Example I.

EXAMPLE IV

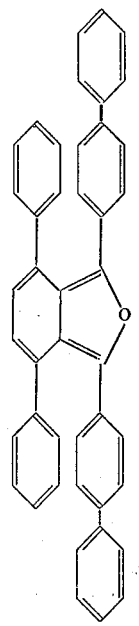

2,7-di-p-xenyl-3,6-diphenylisobenzofuran [1]

This compound was prepared in the same manner as the isobenzofuran in Example I except that 1,4-di-phenylbutadiene was condensed with 1,2-dixenoylethylene. The yellow fluorescent product obtained after the subsequent reactions with bromine and zinc melted at 266–268°.

EVALUATION OF 2,7-DI-p-XENYL-3,6-DIPHENYLISO-BENZOFURAN

A 2 mM. solution of 2,7-di-p-xenyl-3,6-diphenylisobenzofuran had a brightness of 17 foot lamberts at 7 v., under conditions described in Example I.

When the voltage imposed on a 5 mM. solution of the isobenzofuran under the conditions described in Example I was decreased from 8 v. to 7 v. to 6 v., the brightness of the solution decreased from 10.8 foot lamberts to 8.0 foot lamberts to 1.7 foot lamberts. Conversely, lowering the voltage increased the lifetime of the light emitting process from 95 minutes, to 225 minutes and 405 minutes. At higher than 8 v. brightness and lifetime were both observed to decrease markedly, although figures were not recorded.

EXAMPLE V

Inoperative heterocycles

Under the conditions of Example I the following fluorescent compounds either did not electrochemiluminesce or electrochemiluminesced extremely poorly (< 0.1 foot lamberts):

(1) Acridine Orange (free base)

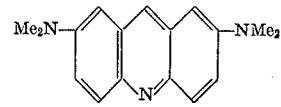

(2) 2,5-diphenylfuran,

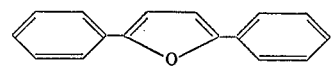

(3) 2,5-di-p-methoxyphenylfuran,

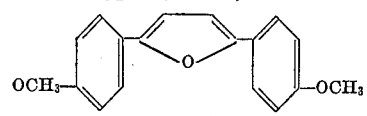

(4) Fuorescein (disodium salt)
(5) Quinine sulfate
(6) Triphenylpyrillium perchlorate
(7) N-methylphenothiazine

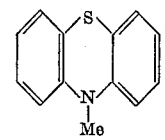

(8) N-methylacridone

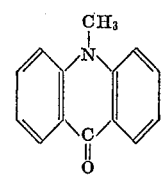

Interpretation of the evaluation of the described compounds of Examples I through V The brightness and lifetime of electrochemiluminescence depends on the interplay of many variables. I am not sure that I know them all.

(1) One of these variables seems to be the voltage. A characteristic voltage—commonly 7–8 v., although 5–10 v. is probably the ultimate range.

---

[1] Note.—Xenyl is p-phenylphenyl.

(2) Another variable is the frequency of the imposed A.C. current. The tetraphenylisobenzofuran showed increased brightness at 120–130 c.p.s. relative to 60 c.p.s. There is not sufficient improvement in this case to use the higher frequency in other studies. Each compound may well have its own characteristic A.C. frequency for maximum brightness.

(3) Another factor is the wavelength of maximum ECC emission. The closer this is to the eyes maximum sensitivity, the brighter the light will appear. A rough correlation of this is observed in the isobenzofurans. There compounds all emit at the same wavelength maximum as their fluoroescence spectrum maximum. This is not true with all electrochemiluminescent substances.

(4) A further factor is the concentration and solubility of the compound. In DMF the desired concentration appears to be about 10 mM. Many otherwise promising compounds (rubrene) are not that soluble.

(5) Fluoresrence efficiency is also a factor. Of a given number of molecules that reach the excited state only a fraction will, in dropping down to the ground state, emit light that will ultimately be seen by the viewer. This fraction is in turn determined by several factors.

(6)–(10) The nature of the solvent, electrolyte electrodes and geometry of the cell will also effect the brightness and lifetime. DMF, $Bu_4NClO_4$ and Pt gauze spaced as closely as possible have so far proven most desirable.

(11) Stability of the oxidation and reduction products of the fluorescer seems to be involved especially with the lifetime of the ECL event since the voltage range to which the molecule is subjected is great enough for it to undergo both oxidation and reduction by electron transfer. Reaction or decomposition of the oxidation and/r reduction products of the fluorescer results in loss of fluorescer.

Table I below illustrates the optimum brightness, lifetime, and physical properties of the isobenzofurans. This tabel demonstrates many of the points indicated here.

electrochemiluminescent fluorescent compound of the formula:

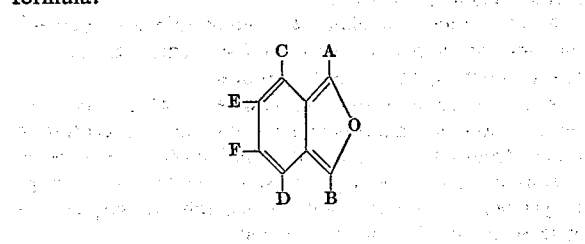

in which A, B, C and D are each a substituent selected from the group consisting of aryl, and singly or multiply substituted aryl, and in which E and F are each a substituent selected from the group consisting of hydrogen, alkyl, and aryl, and said compound being present in a percentage based on weight, sufficient to obtain electrochemiluminescence when said composition subjected to an alternating current of sufficient voltage to oxidize or reduce said compound and of sufficient potential change on cycle-reversal to substantially regenerate said compound in its singlet excited state.

2. A composition recording to claim 1 comprising (1) a solvent, (2) said electrolyte ranging from about 0.01 to about 1.0 molar in concentration in said solvent and (3) said compound ranging from about 1 to 20 millimolar in said solvent.

3. A composition according to claim 2, in which said solvent is dimethylformamide.

4. A method employing the composition of claim 1, for generating a useful, visible, electroluminescent emission in an electrolytic cell, said method comprising subjecting to an alternating current an electrolytic cell containing at least two electrodes in a medium comprising (a) a sub-

TABLE I

| Compound | Voltage for maximum brightness | Frequency for maximum brightness, c.p.s. | Wavelength of maximum ECL emission, mμ | Concentration for maximum brightness, mM. | Fluorescene efficiency, F.E. | Stability of i.e. oxid. prod., sec. | Stability of i.e. red. prod., sec. | Brightness (maximum) foot lamberts | Lifetime (maximum), min. |
|---|---|---|---|---|---|---|---|---|---|
| Rubrene | 6 | 60 | 550 | 2 (~sat.) | .17 | 5 | >15 | 5 | 200 |
| 2,3,6,7-tetraphenyl isobenzofuran | 8 | 120–130 | 510 | 6 | .51 | 1.0 | >15 | 22 | 405 |
| 2,7-di-p-methoxyphenyl-3,6-diphenylisobenzofuran | 7 | | 568 | 10 | .53 | 0.6 | >15 | 37 | 280 |
| 2,7-diphenyl-3,6-di-p-methoxyphenylisobenzofuran | 8 | | 510 | | | 3.9 | >15 | 3.2 (5 mM.) | 80 |
| 2,3,6,7-tetra-p-methoxy phenylisobenzofuran | 7 | | 530 | | | 0.5 | >15 | 19 | 120 |
| 2,7-di-p-xenyl-3,6-diphenylisobenzofuran | 7 | | 527 | | | 4.5 | >15 | 17 (2 mM.) | 220 |
| 2,3,4,5,6,7-hexaphenyl islbenzofuran | 7 | | 495 | | .64 | <0.1 | >15 | <1 (2 mM.) | 90 |
| 2,3,6,7-tetraphenyl isobenzothiophene | | | 530 | <1 (sat.) | .24 | | >10 | | |
| 2,7-diphenylisobenzofuran | | | 485 | | | <0.1 | >15 | | |

The last two columns in the table clearly indicate in terms of maximum brightness and lifetime the compounds which are most desirable. Note that the brightness is more than seven times that of the brightest electrochemiluminescent material known until now (rubrene) and the lifetime is more than twice as long. Further improvements in lifetimes in these systems can be anticipated when the many variables which affect this property are fully explored.

Clearly the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:

1. A composition comprising an electrolyte and an stantially inert solvent, and (b) a composition according to claim 1, said alternating current being at a sufficient voltage (potential) in at least one electrode to convert said fluorescent organic compound to its corresponding oxidized or reduced state, by giving up or taking on at least one electron, and said alternating current providing sufficient potential (voltage) change on reversal of the alternating cycle to provide an amount of energy about sufficient to substantially regenerate said fluorescent organic compound in its singlet excited state.

5. The process of claim 4 wherein said fluorescent compound A, B, C, and D substituents are each phenyl groups, and E and F are hydrogen, said compound being 2,3,6,7-tetraphenylisobenzofuran.

6. The process of claim 4 wherein said electrochemiluminescent-fluorescent composition comprises 2,7-di-p-methoxyphenyl-3,6-diphenylisobenzofuran.

7. The process of claim 4 wherein the electrochemiluminescent fluorescer comprises 2,7-diphenyl-3,6-di-p-methoxyphenylisobenzofuran.

8. The process of claim 4 wherein said electrochemiluminescent-fluorescent composition comprises 2,3,6,7-tetra(p-methoxyphenyl)isobenzofuran.

9. A process according to claim 4, in which said fluorescent electrochemiluminescent compound concentration ranges from about 5 to about 10 millimolars, the concentration of electrolyte is at least 0.1 molar, the voltage ranges between about 6 and 7 volts, and the frequency is at least about 60 cycles per second.

References Cited

UNITED STATES PATENTS

| 3,319,132 | 5/1967 | Chandross | 313—358 |
|---|---|---|---|
| 3,213,440 | 10/1965 | Gesteland | 313—358 |

OTHER REFERENCES

Lepage, 1,4,5,8,9,10-hexaphenylanthracene, Chem. Abstracts, vol. 63, 16272(c).

JAMES W. LAWRENCE, *Primary Examiner.*

R. JUDD, *Assistant Examiner.*

UNITED STATES PATENT OFFICE
CERTIFICATE OF CORRECTION

Patent No. 3,399,328                                                       August 27, 1968

Arnold Zweig

It is certified that error appears in the above identified patent and that said Letters Patent are hereby corrected as shown below:

Column 1, lines 34 to 40, the formula should appear as shown below:

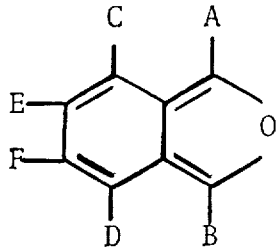

Column 3, line 17, "tone" should read -- one --. Column 6, line 56, "etthanol" should read -- ethanol --; line 60, "or" should read -- of --. Column 9, line 11, "There" should read -- These --; line 33, "and/r" should read -- and/or --; line 35, "tabel" should read -- table --. Columns 9 and 10, TABLE I, nineth column, after line 6 thereof, insert -- (5mM.) --.

Signed and sealed this 24th day of March 1970.

(SEAL)
Attest:

EDWARD M. FLETCHER, JR.                              WILLIAM E. SCHUYLER, JR.
Attesting Officer                                             Commissioner of Patents